United States Patent [19]

Kamada et al.

[11] Patent Number: 4,619,856

[45] Date of Patent: Oct. 28, 1986

[54] MAGNETIC RECORDING MEDIUM

[75] Inventors: Koh Kamada; Hiroshi Hashimoto; Tsutomu Okita; Noburo Hibino, all of Kanagawa, Japan

[73] Assignee: Fuji Photo Film Co., Ltd., Kanagawa, Japan

[21] Appl. No.: 737,968

[22] Filed: May 28, 1985

[30] Foreign Application Priority Data

May 28, 1984 [JP] Japan ................................ 59-106419
Sep. 18, 1984 [JP] Japan ................................ 59-195406

[51] Int. Cl.$^4$ ............................................. G11B 5/70
[52] U.S. Cl. ................................... 428/143; 360/134; 360/135; 360/136; 427/44; 427/131; 427/128; 428/148; 428/323; 428/694; 428/900; 428/522
[58] Field of Search ................... 427/44, 128, 131; 428/694, 900, 425.9, 323, 143, 148; 360/134–136

[56] References Cited

U.S. PATENT DOCUMENTS

| 4,183,976 | 1/1980 | Yamada | 427/130 |
| 4,468,436 | 8/1984 | Okita | 428/423.3 |
| 4,496,626 | 1/1985 | Kasuga | 428/336 |
| 4,511,629 | 4/1985 | Konno | 428/522 |

*Primary Examiner*—Ellis P. Robinson
*Attorney, Agent, or Firm*—Sughrue, Mion, Zinn, Macpeak, and Seas

[57] ABSTRACT

A magnetic recording medium is described, comprising a nonmagnetic support, a magnetic layer, and a nonmagnetic intermediate layer provided between the support and the magnetic layer, the nonmagnetic intermediate layer containing a radiation-polymerizable compound and finely divided particles, the nonmagnetic intermediate layer being polymerized by irradiation and having a surface roughness from about 0.001 to 0.02 μm. This medium provides reduced gap loss between the medium and a magnetic head, and is suitable for use in high density recording.

9 Claims, No Drawings

MAGNETIC RECORDING MEDIUM

FIELD OF THE INVENTION

The present invention relates to a magnetic recording material, and more particularly, to a magnetic recording medium suitable for use in high density recording.

BACKGROUND OF THE INVENTION

To reduce what is termed the "gap loss" between a magnetic head and a magnetic tape in a magnetic recording medium for use in high density recording since increase of "gap loss" causes reproduced output and C/N to decrease, it is necessary to improve the surface characteristics of the magnetic layer of the medium. For this purpose, as well as improvements in techniques for the formation of the magnetic layer, such as dispersion of magnetic particles, coating and the formation of a surface, an improvement in the surface characteristics (i.e., the surface smoothness) of a support is also needed. As the recording density is increased, the recording wavelength is decreased. Thus, in order to avoid thickness loss which results in the deterioration of reproduced output and C/N, an attempt to decrease the thickness of the magnetic layer has been made. When this is done, however, the surface characteristics of the support exert increased influences on the properties of the magnetic layer. The above surface characteristics of the support is described in U.S. Pat. Nos. 3,876,608, 4,461,797 and 4,489,117.

Improving the surface characteristics (i.e., the surface smoothness) of the support is limited by two factors. First, if the surface characteristics (i.e., the surface smoothness) of the medium are good, at the production step where the medium is shaped into a tape and wound, the friction resistance of the tape to a conveying roller is increased and thus, in many cases, the tape moves in a zigzag direction and wrinkles. Second, the friction resistance between the tapes is increased, thereby producing an unevenness in the shape of a winding roll.

In order to overcome the above contradictory problems, various attempts have been made. Japanese Patent Application (OPI) No. 109605/78 (The term "OPI" as used herein means a "published unexamined Japanese patent application"), for example, describes a method of forming a magnetic layer in which finely divided thermoplastic resin particles are provided on a support in such a manner that the particles project from the surface of the support and are then removed by dissolving with a solvent to improve running properties of the magnetic layer and, thereafter, the magnetic layer is formed on the surface of the support.

Japanese Patent Publication No. 14555/71 describes a method in which a solution of a polymer such as polyamide and polyester is coated on a support and dried to form fine wrinkles, and a magnetic layer is formed on the finely wrinkled polymer coating. Japanese Patent Publication No. 6117/72 describes the same method as described in Japanese Patent Publication No. 14555/71, but using copolyesters, for example, as the polymers to be coated on the support. Also Japanese Patent Publication No. 38001/75 describes the same method as described in Japanese Patent Publication No. 14555/71, but using thermoplastic polyesters as the polymers to be coated on the support.

All the above methods, however, fail to produce a magnetic recording medium having satisfactory characteristics for high density recording.

SUMMARY OF THE INVENTION

An object of the present invention is to provide a magnetic recording medium suitable for high density recording.

Another object of the present invention is to provide a magnetic recording medium with a nonmagnetic support, the surface roughness of which is appropriately controlled so that the magnetic recording medium has surface characteristics suitable for high density recording.

It has been found that the object can be attained by sandwiching an intermediate layer having the necessary surface roughness between the nonmagnetic support and the magnetic layer.

The present invention relates to a magnetic recording medium comprising a nonmagnetic support and a magnetic layer, and a nonmagnetic intermediate layer provided between the support and the magnetic layer, wherein the nonmagnetic intermediate layer contains a radiation polymerizable compound and finely divided particles the nonmagnetic intermediate layer being polymerized by irradiation.

In a preferred embodiment, the nonmagnetic intermediate layer has a surface roughness, Ra, ranging between about 0.001 and 0.02 $\mu$m.

DETAILED DESCRIPTION OF THE INVENTION

The term "surface roughness" as used herein indicates an average roughness of a central line as defined in JIS B0601 Vol. 5 and is measured at a cut-off value of 0.25 mm.

Radiation-polymerizable compounds which are used in the intermediate layer of the magnetic recording medium of the present invention, are compounds containing at least one carbon-carbon unsaturated bond. Examples of these compounds include acrylates, acrylamides, methacrylates, methacrylamides, allyl compounds, vinyl ethers, vinyl esters, vinyl heterocyclic compounds, N-vinyl compounds, styrenes, crotonic acids, itaconic acids, and olefins. Preferred compounds are compounds containing at least two acryloyl or methacryloyl groups, including acrylates such as diethylene glycol diacrylate, triethylene glycol diacrylate, tetraethylene glycol diacrylate, trimethylolpropane triacrylate, and pentaerythritol tetraacrylate, methacrylates such as diethylene glycol dimethacrylate, triethylene glycol trimethacrylate, tetraethylene glycol dimethacrylate, trimethylolpropane trimethacrylate, and pentaerythritol tetramethacrylate, and the esters of other polyols having two or more functional groups and acrylic acid or methacrylic acid.

The above compounds may be used in the present invention in the form of polymers. Preferred polymeric compounds have an acrylic or methacrylic acid ester bond at the terminal of the main chain, or as a side chain, as described in A. Vranckem, *Fatipec Congress*, 11, 19 (1972). An example is a polymeric compound having the following general formula:

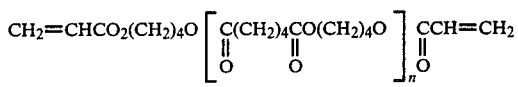

wherein n is a positive integer. In the above polymeric compound, the polyester skelton may be a polyurethane skelton, an epoxy resin skelton, a polyether skelton, a polycarbonate skelton, or a mixture thereof. Though the molecular weight is not critical, it is from 200 to 20,000, preferably from 500 to 10,000, and more preferably from 1,000 to 5,000.

The above radiation-polymerizable compounds can be used alone or in a combination of two or more in any desired ratio.

In addition, thermoplastic resins such as a vinyl chloride/vinyl acetate copolymer, a cellulose resin, an acetal resin, a vinyl chloride/vinylidene chloride copolymer, a urethane resin, and an acrylonitrile/butadiene copolymer can be used, if desired, in admixture with the above radiation-polymerizable compounds.

The radiation which can be used for polymerization in the present invention to effect polymerization are an electron beam and ultraviolet light. When ultraviolet light are applied, it is necessary to add photopolymerization initiators.

As photopolymerization initiators, aromatic ketones can be used. The particular aromatic ketone used is not critical; preferably aromatic ketones are used having relatively large absorption coefficients at wave-lengths of 254, 313, and 365 nm, i.e., those forming the bright line spectrum of a mercury lamp commonly used as an ultraviolet irradiation light source. Typical examples of such aromatic ketones are acetophenone, benzophenone, benzoin ethyl ether, benzylmethyl ketal, benzyl ethyl ketal, benzoin isobutyl ketone, hydroxydimethyl phenyl ketone, 1-hydroxycyclohexyl phenyl ketone, 2,2-diethoxyacetophenone, and Mickler's ketones.

The amount of the aromatic ketone added is from about 0.5 to 20 parts by weight, preferably from about 2 to 15 parts by weight, and more preferably from about 3 to 10 parts by weight per 100 parts by weight of the polymerizable compound.

Finely divided particles which are used in the intermediate layer of the magnetic recording medium of the present invention are spherical or flaky particles having an average primary particle size (diameter) of at least 50 Å, preferably from about 70 to 5,000 Å. These finely divided particles are distributed in the intermediate layer in such a manner that the average height of particles protruded from the surface of intermediate layer is from about 50 to 2,000 Å, and preferably from 100 to 1,000 Å, further the number of protrusive particles is from about $10^6$ to $10^9$, and preferably from $10^7$ to $3 \times 10^8$ per square millimeter. The average diameter of the finely divided particles and the density of the exposed particles per unit area are controlled within more limited ranges depending on the purpose for which the magnetic recording material is used.

The finely divided particles which are used in the present invention can have various compositions, including organic particles and inorganic particles. Organic particles which can be used include particles of, e.g., a benzoguamine/formaldehyde copolymer and polyethylene tetrafluoride, which are commercially available as organic matting agents. Inorganic particles are usually designated as inorganic powders or abrasives and are of various compositions such as $\alpha$-alumina, $\gamma$-alumina, silicon carbide, titanium oxide, magnesium oxide, iron phosphide, titanium carbide, titanium nitride, $\alpha$- or $\beta$-silicon oxide, aluminum, calcium oxalate, iron, $\alpha$-ferrous oxide, zinc, zinc dioxide, nickel (II) oxide, nickel, copper, chromia, magnesium hydroxide, zirconia, yttrium, ceria, zircon, and antimony oxide. In addition, carbon black can be used.

Representative examples of carbon black which can be used are Raven 1035 (270 Å), Conductex 975 (200 Å), and Neo Spectra Mark II (130 Å) produced by Columbian Carbon Co., Diablack-H (300 Å) and Furnex (800 Å) produced by Mitsubishi Kasei Co., Ltd., Asahi #80 ISAF (230 Å), Ashai #60 (510 Å) and Asahi Thermal (900 Å) produced by Asahi Carbon Co., Ltd., Thermblack MT (2,700 Å) produced by Cancarb Co., Ltd., and Sevacarb Mt (3,500 Å) produced by Seralco Co., Ltd.

The surface roughness of the intermediate layer of the magnetic recording material is from about 0.001 to 0.02 $\mu$m, preferably from about 0.001 to 0.01 $\mu$m, and more preferably from about 0.002 to 0.007 $\mu$m.

In coating a mixture of the radiation-polymerizable compound, finely divided particles of organic or inorganic particles, and if desired, the aromatic ketone on the support, various organic solvents optionally can be used. The amount of protruded particles, i.e., the surface roughness can be controlled by changing the amount of the organic solvent added. That is, when the organic solvent increases, the amount of protruded particles increases, while if the organic solvent decrease, the amount of the particles decrease. Organic solvents which can be used include ketones such as acetone, methyl ethyl ketone, methyl isobutyl ketone, and cyclohexanone; alcohols such as methanol, ethanol, propanol, and butanol; esters such as methyl acetate, ethyl acetate, butyl acetate, ethyl lactate, and glycol acetate monoethyl ether; glycol ethers such as ether, glycol dimethyl ether, glycol monoethyl ether, and dioxane; aromatic hydrocarbons such as benzene, toluene, and xylene; and chlorinated compounds such as methylene chloride, ethylene chloride, carbon tetrchloride chloroform, ethylene chlorohydrin, and dichlorobenzene.

As the electron beam accelerator, the Van de Graft scanning method, double scanning method, or curtain beam method can be employed. The curtain beam method is preferred in that a great output can be obtained relatively inexpensively. In connection with electron beam characteristics, the accelerating voltage is from about 10 to 1,000 kv, and preferably from about 50 to 300 kv, and the absorption dose is from about 0.5 to 20 Mrad and preferably from about 1 to 10 Mrad. If the accelerating voltage is less than about 10 kv, the transmitted amount of energy is insufficiently low. On the other hand, if it is in excess of about 1,000 kv, the energy efficiency for polymerization drops, which is undesirable from an economical standpoint. If the absorption dose is less than about 0.5 Mrad, the hardening reaction proceeds only insufficiently, producing a magnetic layer having a low mechanical strength. On the other hand, if it is in excess of about 20 Mrad, the energy efficiency for hardening reaction drops, and the irradiated object generates heat, undesirably causing the deformation of, in particular, the plastic support.

Supports which can be used include polyesters such as polyethylene terephthalate and polyethylene 2,6-naphthalate; polyolefins such as polyethylene and polypropylene; cellulose derivatives such as cellulose triacetate, cellulose diacetate, cellulose acetate butyrate, and cellulose acetate propionate; vinyl polymers such as polyvinyl chloride and polyvinylidene chloride; and other polymers such as polycarbonates, polyimides, and polyamideimides. In addition, depending on the use of the magnetic recording medium, nonmagnetic metals such as aluminum, copper, tin, and zinc, or nonmagnetic alloys containing such metals, and stainless steel, paper coated or laminated with polymers of α-olefins having from 2 to 10 carbon atoms, such as ethylene and propylene, copolymers of such α-olefins such as an ethylene/butene copolymer, and so forth can be used.

The surface roughness (Ra) of the nonmagnetic support that is coated in the present invention is about 0.001 to 0.05 μm, preferably from about 0.002 to 0.03 μm, and more preferably from about 0.003 to 0.02 μm.

The nonmagnetic support can be prepared so that the surface roughness of the upper surface is different from that of the back surface. The production of such supports, however, requires high technology and the production efficiency is low. In the present invention, therefore, supports are generally used with nearly equal surface roughnesses of the upper and back surfaces, although the present invention is not limited thereto.

A back layer can be provided on the back of the support for the purpose of improving running properties, for example, as described in U.S. Pat. Nos. 3,761,311 and 3,166,688. In this case, the effects of the present invention can be obtained when the surface roughness of the back layer is controlled to about 0.010 μm or more, preferably about 0.015 μm or more.

Details of ferromagnetic substances, additives, and organic solvents to be used in the magnetic layer, along with the dispersion or coating method, and other particulars are described in Japanese Patent Application (OPI) No. 46,011/79, U.S. Pat. Nos. 4,135,016 and 4,205,354 and the magnetic layers disclosed can be applied to the present invention.

The magnetic layer provided on the polymerized or hardened intermediate layer may be composed mainly of a powdered ferromagnetic substance and a binder, or a magnetic metal thin film. The magnetic metal thin film can be produced either by a method in which the thin film is formed in a vacuum chamber or by a plating method. The former method is preferred in that the speed of production of the thin film is high, the process of production is simple, and the disposal of wastes is not needed. In accordance with this method, a substance or compound to be deposited is vaporized or ionized and then deposited on a substrate in a dilute gas or vacuum. This method includes the vapor deposition method, the sputtering method, the ion plating method, and the chemical vapor plating method. The above methods are described in U.S. Pat. Nos. 3,342,632, 4,354,908, 3,406,040, and 3,573,981.

As ferromagnetic substances, ferromagnetic metals such as iron, cobalt, and nickel, and ferromagnetic alloys such as Fe—Co, Fe—Ni, Co—Ni, Fe—Si, Fe—Rh, Co—P, Co—B, Co—Si, Co—V, Co—Y, Co—La, Co—Ce, Co—Pr, Co—Sm, Co—Pt, Co—Mn, Fe—Co—Ni, Co—Ni—P, Co—Ni—B, Co—Ni—Ag, Co—Ni—Na, Co—Ni—Ce, Co—Ni—Zn, Co—Ni—Cu, Co—Ni—W, Co—Ni—Re, and Co—Sm—Cu can be used.

The thickness of the thin film as the magnetic layer is from about 0.05 to 2 μm and preferably from about 0.1 to 0.4 μm.

The present invention is described in greater detail with reference to the following examples, which are not to be construed as limiting its scope in any way. Unless otherwise indicated, all parts, percents and ratios are by weight.

EXAMPLE 1

| Ingredients (A) | |
| --- | --- |
| Diethylene glycol diacrylate | 250 parts |
| Powdered polyethylene terefluoride (partaicle diameter: about 2,000 Å) | 10 parts |
| Toluene | 100 parts |
| Acetone | 100 parts |

The above ingredients (A) were kneaded in a ball mill for 10 hours to prepare a coating solution.

This coating solution was coated on a 14.5 μm thick polyethylene terephthalate support (surface roughness: 0.015 μm) in a wet thickness of 0.5 μm and then irradiated for 100 msec with an electron beam at an accelerating voltage of 160 kv and a beam current of 5 mA (absorption dose: 5 Mrad). The support with the intermediate layer coated thereon had a surface roughness of 0.004 μm.

On the intermediate layer were oblique vapor deposited cobalt and nickel by the use of a continuous vapor deposition apparatus to form a magnetic thin film (film thickness: 2,000 Å; Co content: 80%). The magnetic recording medium thus produced was slit to ½ inch widths to produce a magnetic video tape (Sample No. 1).

EXAMPLE 2

| Ingredients (B) | |
| --- | --- |
| Diethylene glycol diacrylate | 250 parts |
| Carbon black (Asahi Thermal Produced by Asahi Carbon Co., Ltd.; average primary particle diameter: 900 Å) | 10 parts |
| Toluene | 100 parts |
| Acetone | 100 parts |

The above ingredients (B) were kneaded in a ball mill for 10 hours to prepare a coating solution. This coating solution was coated on a 14.5 μm thick polyethylene terephthalate support (surface roughness: 0.022 μm) in a wet thickness of 0.5 μm and, after drying, was irradiated for 100 msec with an electron beam at an acceleration voltage of 160 kv and a beam current of 5 mA (absorption dose: 5 Mrad) to provide a polymeric intermediate layer.

On the above intermediate layer were oblique vapor deposited cobalt and nickel by the use of a continuous vapor deposition apparatus to form a ferromagnetic thin film (film thickness: 2,000 Å; Co content: 75%). The magnetic recording material thus produced was slit to ½ inch widths to produce a magnetic video tape (Sample No. 2).

EXAMPLE 3

A magnetic tape (Sample No. 3) was produced in the same manner as in Example 2 except that as the carbon black Diablack-H produced by Mitsubishi Kasei Co., Ltd. (average primary particle diameter: 300 Å) was used.

EXAMPLE 4

A magnetic tape (Sample No. 4) was produced in the same manner as in Example 2 except that as the carbon black Neo Spectra Mark II produced by Columbian Carbon Co., Ltd. (average primary particle diameter: 130 Å) was used.

EXAMPLE 5

A magnetic tape (Same No. 5) was produced in the same manner as in Example 2 except that as the carbon black Royal Spectra produced by Columbian Carbon Co., Ltd. (average primary particle diameter: 70 Å) was used.

COMPARATIVE EXAMPLE 1

A magnetic tape (Sample No. 6) was produced in the same manner as in Example 2 except that the following ingredients (c) were used to prepare the coating solution.

| Ingredients (C) | |
|---|---|
| Diethylene glycol diacrylate | 250 parts |
| Toluene | 100 parts |
| Acetone | 100 parts |

COMPARATIVE EXAMPLE 2

A magnetic tape (Sample No. 7) was produced in the same manner as in Example 2 except that the intermediate layer was not provided.

EXAMPLE 6

On a 14.5 μm thick polyethylene terephthalate support (surface roughness Ra: 0.030 μm) was provided the same intermediate layer as in Example 2.

| | |
|---|---|
| Co-containing $\gamma$-Fe$_2$O$_3$ (Hc (Coercive force): 630 Oe; particle size: 0.4 × 0.05 × 0.05 μm; cobalt content: 5%) | 300 parts |
| Polyesterpolyurethane (a reaction product of ethylene adipate and 2,4-trilene diisocyanate; ratio by weight: 1/1; styrene equivalent average molecular weight: about 130,000) | 35 parts |
| Vinyl chloride/vinyl acetate/maleic anhydride copolymer (maleic anhydride content: 3.0 wt %; ratio by weight: 86/11/3; degree of polymerization: about 400) | 30 parts |
| Dimethyl polysiloxane (degree of polymerization: about 60) | 2 parts |
| Butyl acetate | 300 parts |
| Methyl isobutyl ketone | 300 parts |

The above ingredients were kneaded in a ball mill for 10 hours.

To the resulting mixture was added 22 parts of a 75 wt% ethyl acetate solution of a triisocyanate compound/trimethylolpropane adduct (Desmodur L-75 produced by Bayer A. G. ; molecular weight: about 760; NCO content: 13.3 wt%), which was then subjected to high-speed shear dispersion for 1 hour to prepare a magnetic coating solution.

This magnetic coating solution was coated on the intermediate layer in a dry thickness of 4 μm. The wet coating thus formed was oriented by running the web for 3 seconds in a DC magnetic field (solenoid coil field: 3000 Gauss) and dried by blowing hot air at 100° C. The magnetic recording medium thus produced was subjected to a calendering treatment and slit to ½ inch widths to produce a magnetic video tape (Sample No. 8).

COMPARATIVE EXAMPLE 3

A magnetic tape (Sample No. 9) was produced in the same manner as in Example 6 except that the intermediate layer was not provided.

The above magnetic tapes were measured for video sensitivity, C/N, and running durability using a video tape recorder VTR (NV-8800 produced by Matsushita Denki Sangyo Co., Ltd.), as follows:

Video Sensitivity

Reproduction output at 4 MHz was measured and expressed in terms of Sample No. 7 (Comparative Example 2) as a base (±0 dB), with the sole exception that Sample No. 8 was evaluated in terms of Sample No. 9 as a base.

C/N

Carrier waves of 3 MHz and 3.5 MHz were recorded, and the ratio of the carrier to the noise (in other words, the signal to noise ratio) when they were reproduced was determined and expressed in terms of Sample No. 7 (Comparative Example 2) as a base (±0 dB), with the sole exception that Sample No. 8 was evaluated in terms of Sample No. 9 as a base.

Running Durability

After the magnetic tapes was run repeatedly 100 times, the decreased in output was measured.

The results are shown in Table.

TABLE

| Sample No. | Features of Magnetic Tape | Surface Roughness of Intermediate Layer Ra (μm) | Video Sensitivity | C/N (dB) 3 MHz | C/N (dB) 3.5 MHz | Decrease in Output (dB) after 100 running |
|---|---|---|---|---|---|---|
| 1 (Example 1) | Intermediate layer: Powdered polyethylene tetrafluoride (2,000 Å) | 0.004 | +4.2 | +5.0 | +4.5 | −0.5 |
| 2 (Example 2) | Intermediate layer: Carbon black (900 Å) | 0.008 | +4.7 | +4.9 | +4.2 | −0.7 |
| 3 (Example 3) | Intermediate layer: Carbon black (300 Å) | 0.006 | +4.3 | +5.0 | +4.4 | −0.5 |
| 4 (Example 4) | Intermediate layer: Carbon black (130 Å) | 0.004 | +4.8 | +5.4 | +4.9 | −0.8 |
| 5 (Example 5) | Intermediate layer: Carbon black (70 Å) | 0.004 | +4.7 | +5.3 | +4.7 | −1.2 |
| 6 (Comparative Example 1) | Intermediate layer: not containing | 0.004 | +4.8 | +5.4 | +4.9 | −5.4 |

TABLE-continued

| Sample No. | Features of Magnetic Tape | Surface Roughness of Intermediate Layer Ra (μm) | Video Sensitivity | C/N (dB) 3 MHz | C/N (dB) 3.5 MHz | Decrease in Output (dB) after 100 running |
|---|---|---|---|---|---|---|
| 7 (Comparative Example 2) | carbon black No intermediate layer | *0.022 | ±0 | ±0 | ±0 | −3.0 |
| 8 (Example 6) | Intermediate layer: Carbon black (900 Å) Magnetic layer: Co-containing γ-Fe$_2$O$_3$ | 0.018 | +3.8 | +3.2 | +3.9 | −0.4 |
| 9 (Comparative Example 3) | No intermediate layer Magnetic layer: Co-containing γ-Fe$_2$O$_3$ | *0.030 | ±0 | ±0 | ±0 | −2.8 |

*The surface roughness (Ra) represents the surface roughness of the support

It can be seen from the results that the present invention provides a high density magnetic recording medium superior in video sensitivity, C/N, and running durability.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a nonmagnetic support, a magnetic layer, and a nonmagnetic intermediate provided between the support and the magnetic layer, wherein the nonmagnetic intermediate layer contains a radiation-polymerizable compound and finely divided spherical or flaky particles having an average primary particle size (diameter) of at least 50 Å, which particles are distributed in the intermediate layer in such a manner that the average height of the particles protruded from the surface of the intermediate layer is from about 50 to 2,000 Å, the nonmagnetic intermediate layer being polymerized by irradiation, wherein the surface roughness of the nonmagnetic intermediate layer, Ra, is from about 0.001 to 0.02 μm.

2. The magnetic recording medium as claimed in claim 1, wherein the polymerizable compound is selected from the group consisting of compounds containing at least two acryloyl groups, compounds containing at least two methacryloyl groups, and polymeric compounds having an acrylic or methacrylic acid ester bond at a terminal of the main chain or a side chain thereof.

3. The magnetic recording medium as claimed in claim 1, wherein the finely divided particles have an average primary particle diameter of at least about 100 Angstroms, the particles being provided in the intermediate layer such that that number of protrusive particles is from about $10^6$ to $10^9$ particles per square millimeter.

4. The magnetic recording medium as claimed in claim 1, wherein the surface roughness of the nonmagnetic intermediate layer, Ra is from about 0.002 to 0.007 μm.

5. The magnetic recording medium as claimed in claim 1, wherein the spherical or flaky particles have an average primary particle size (diameter) of from about 70 to 5,000 Å.

6. The magnetic recording medium as claimed in claim 5, wherein the number of protrusive particles is from about $10^7$ to $3 \times 10^8$ per square millimeter.

7. The magnetic recording medium as claimed in claim 6, wherein the height of the particles protruded from the surface of the intermediate layer is from 100 to 1,000 Å.

8. The magnetic recording medium as claimed in claim 7, wherein the surface roughness, Ra, of the nonmagnetic support is from about 0.001 to 0.5 μm.

9. The magnetic recording medium as claimed in claim 8, wherein a back layer is provided on the back of the support opposite the surface carrying the magnetic layer, and the surface roughness of the back layer is about 0.01 μm or more.

* * * * *